(12) United States Patent
Sasu et al.

(10) Patent No.: US 7,114,255 B2
(45) Date of Patent: Oct. 3, 2006

(54) METHOD OF MAKING A GAS TURBINE ENGINE DIFFUSER

(75) Inventors: Ioan Sasu, Brossard (CA); Bertrand Gendreau, Ste-Julle (CA); Robert Francois Lanoue, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 321 days.

(21) Appl. No.: 10/722,125

(22) Filed: Nov. 26, 2003

(65) Prior Publication Data

US 2004/0128832 A1    Jul. 8, 2004

Related U.S. Application Data

(63) Continuation of application No. 10/194,556, filed on Jul. 15, 2002, now Pat. No. 6,760,971.

(51) Int. Cl.
*B23P 15/00* (2006.01)
*B23P 13/00* (2006.01)
*B23B 35/00* (2006.01)
*B23P 15/04* (2006.01)

(52) U.S. Cl. .......... 29/889.2; 29/889; 29/557; 29/558; 408/1 R

(58) Field of Classification Search .............. 29/90.01, 29/889, 889.2, 557, 558; 415/211.2, 226, 415/208.1, 208.2; 408/1 R
See application file for complete search history.

(56) References Cited

U.S. PATENT DOCUMENTS 3,059,315 A * 10/1962 Chambers .................. 29/90.01
5,131,142 A *  7/1992 Brasz ....................... 29/888.02
5,252,027 A * 10/1993 Brasz ....................... 415/224.5

FOREIGN PATENT DOCUMENTS

GB          1040385       8/1966

\* cited by examiner

*Primary Examiner*—Jermie E. Cozart
(74) *Attorney, Agent, or Firm*—Ogilvy Renault LLP

(57) ABSTRACT

A method of machining a plurality of intersecting bores in an object, the method comprising steps of machining a first bore, plugging the first bore, machining a second bore so as to intersect the first bore, and unplugging the first bore.

15 Claims, 10 Drawing Sheets

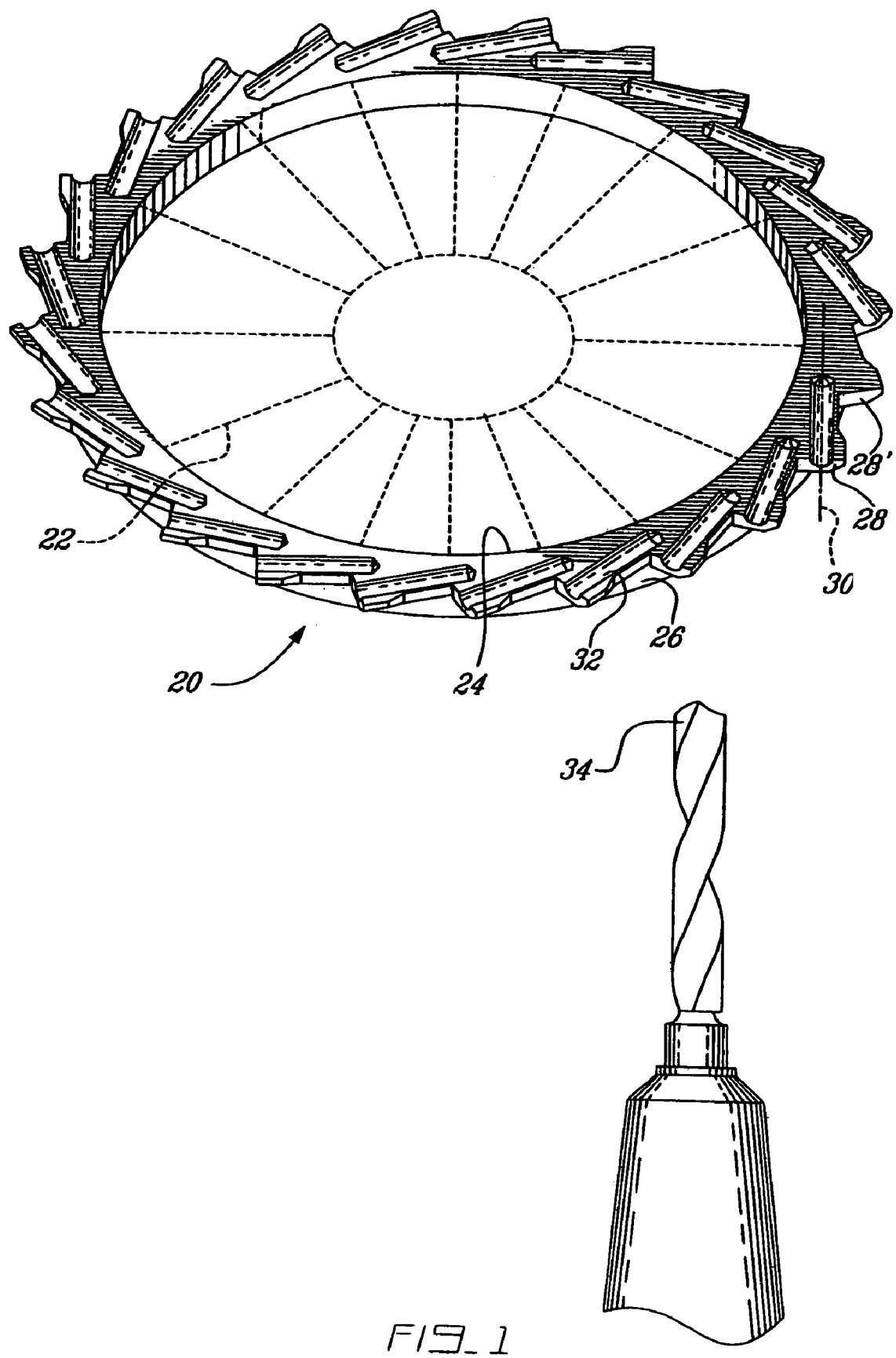
FIG_1

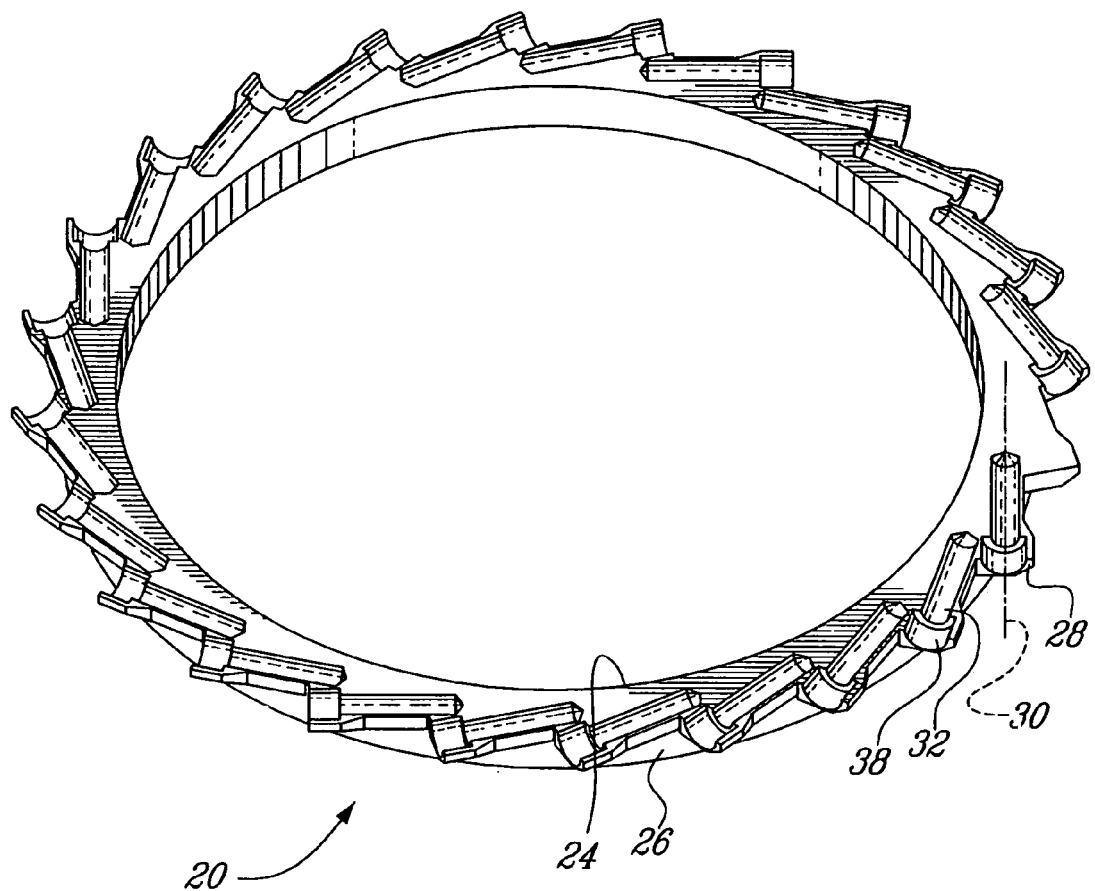
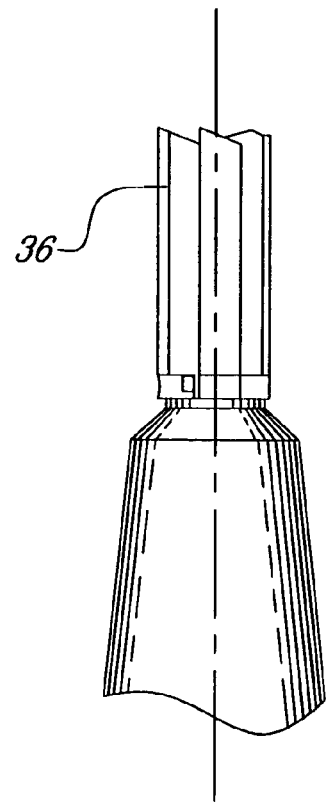
FIG_2

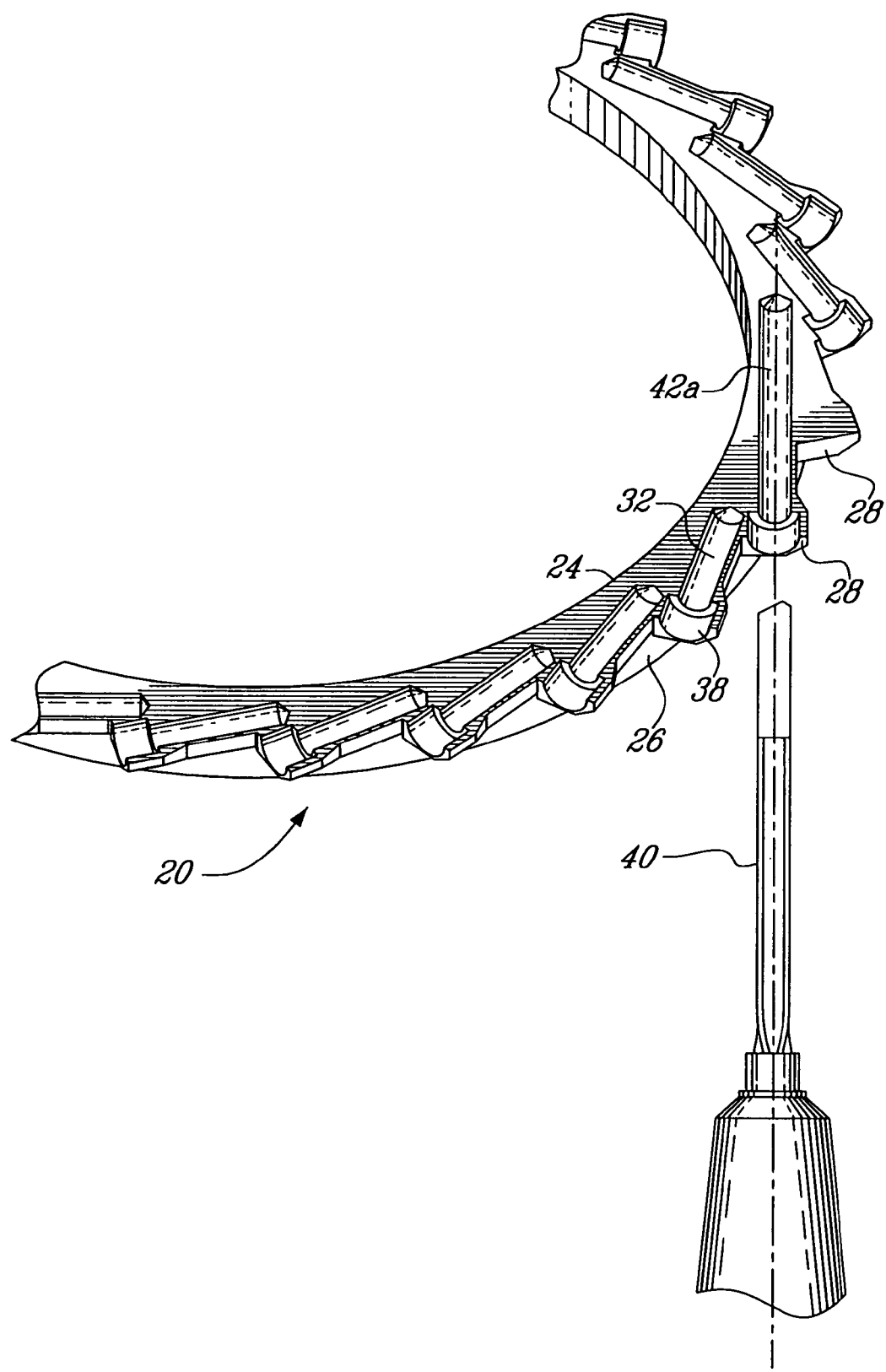
FIG_3

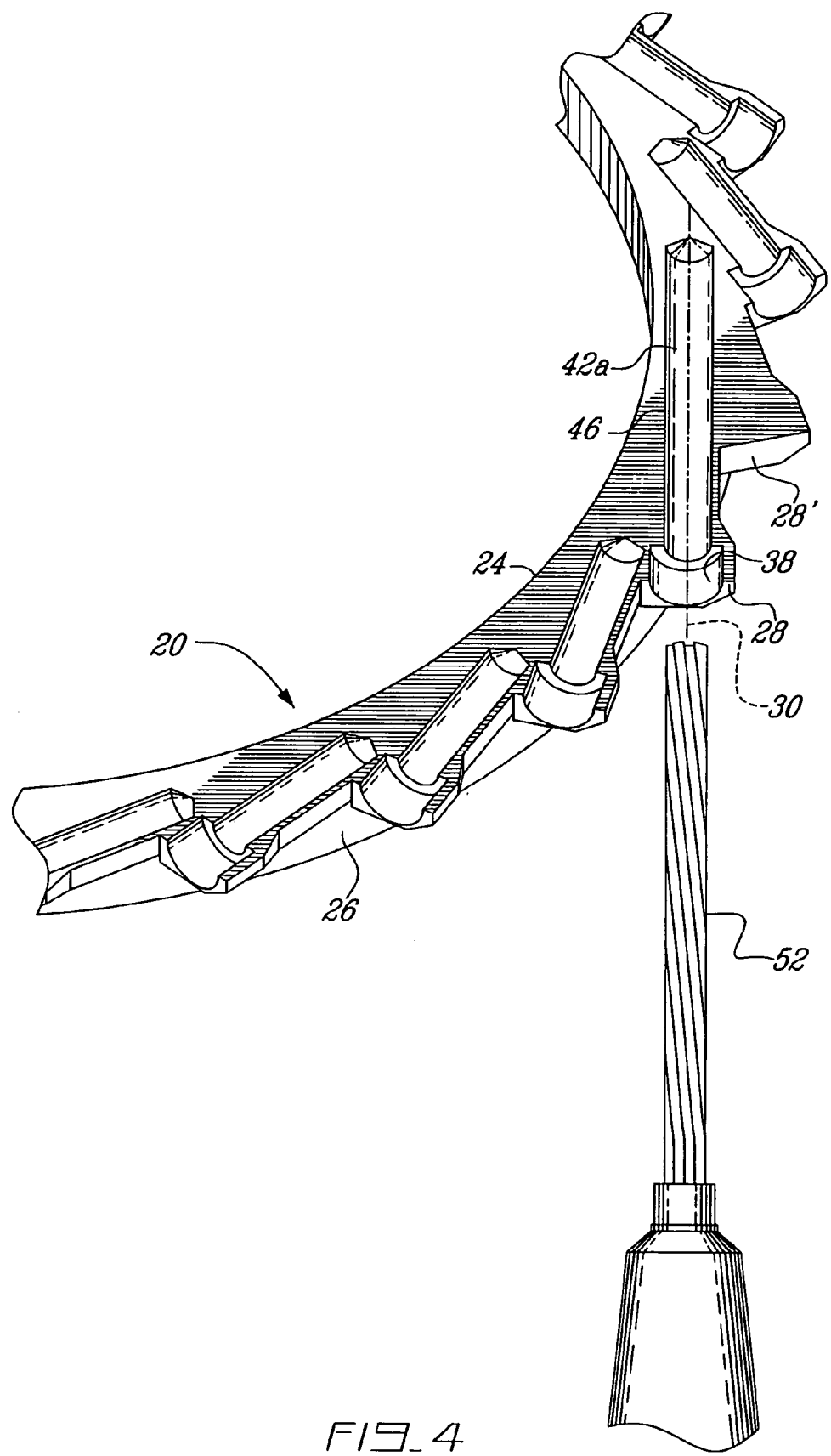
FIG_4

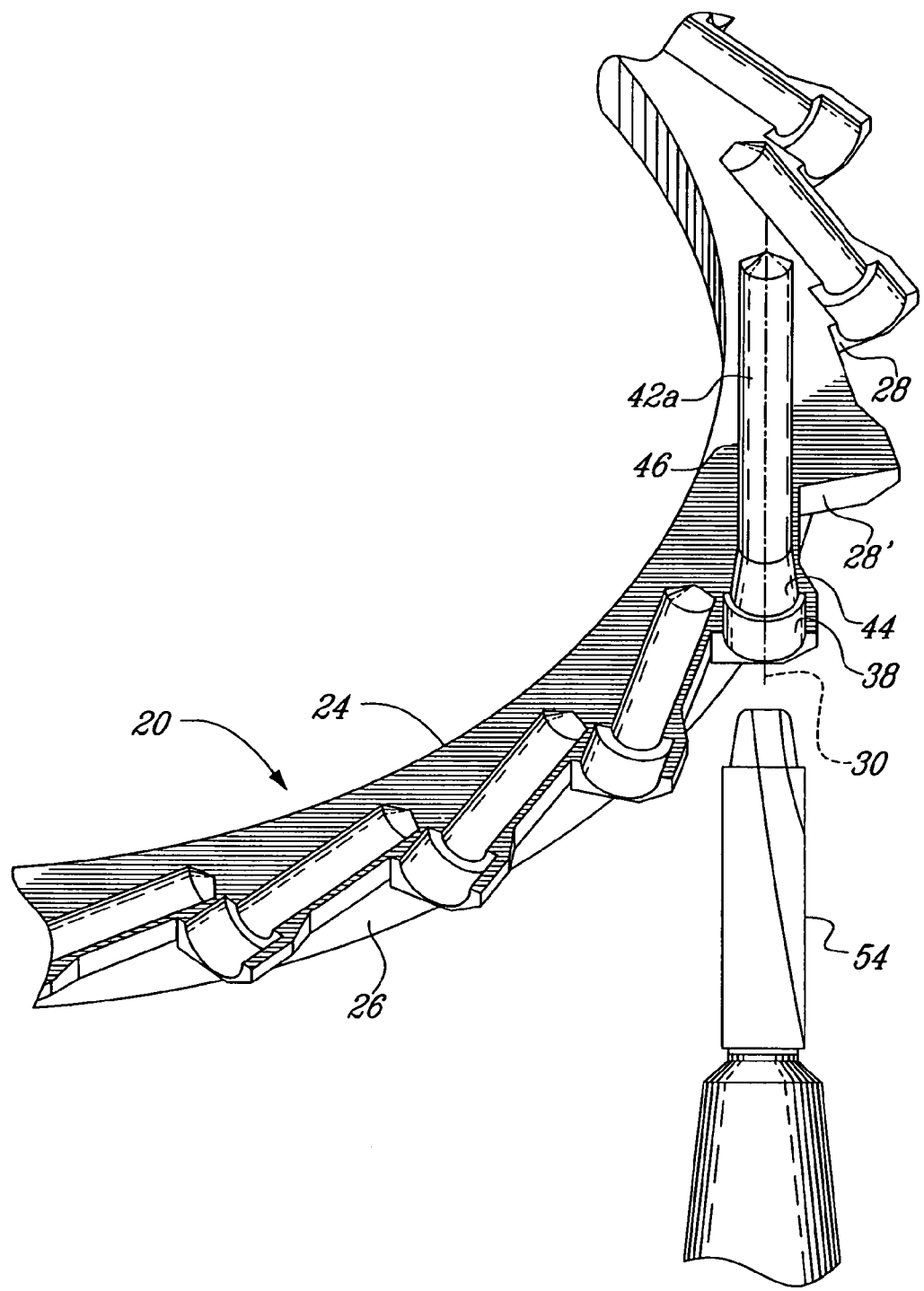
FIG_5

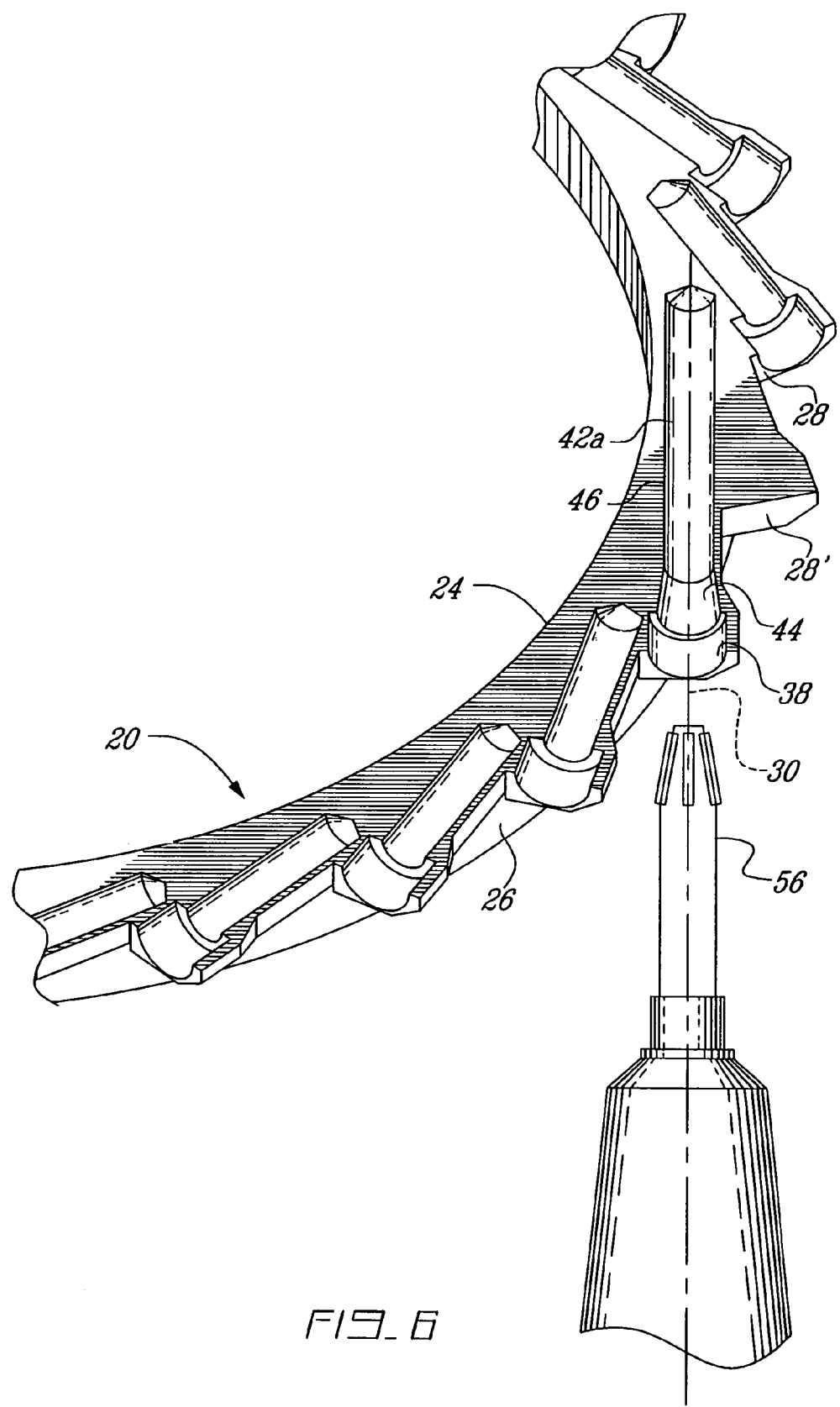
FIG_6

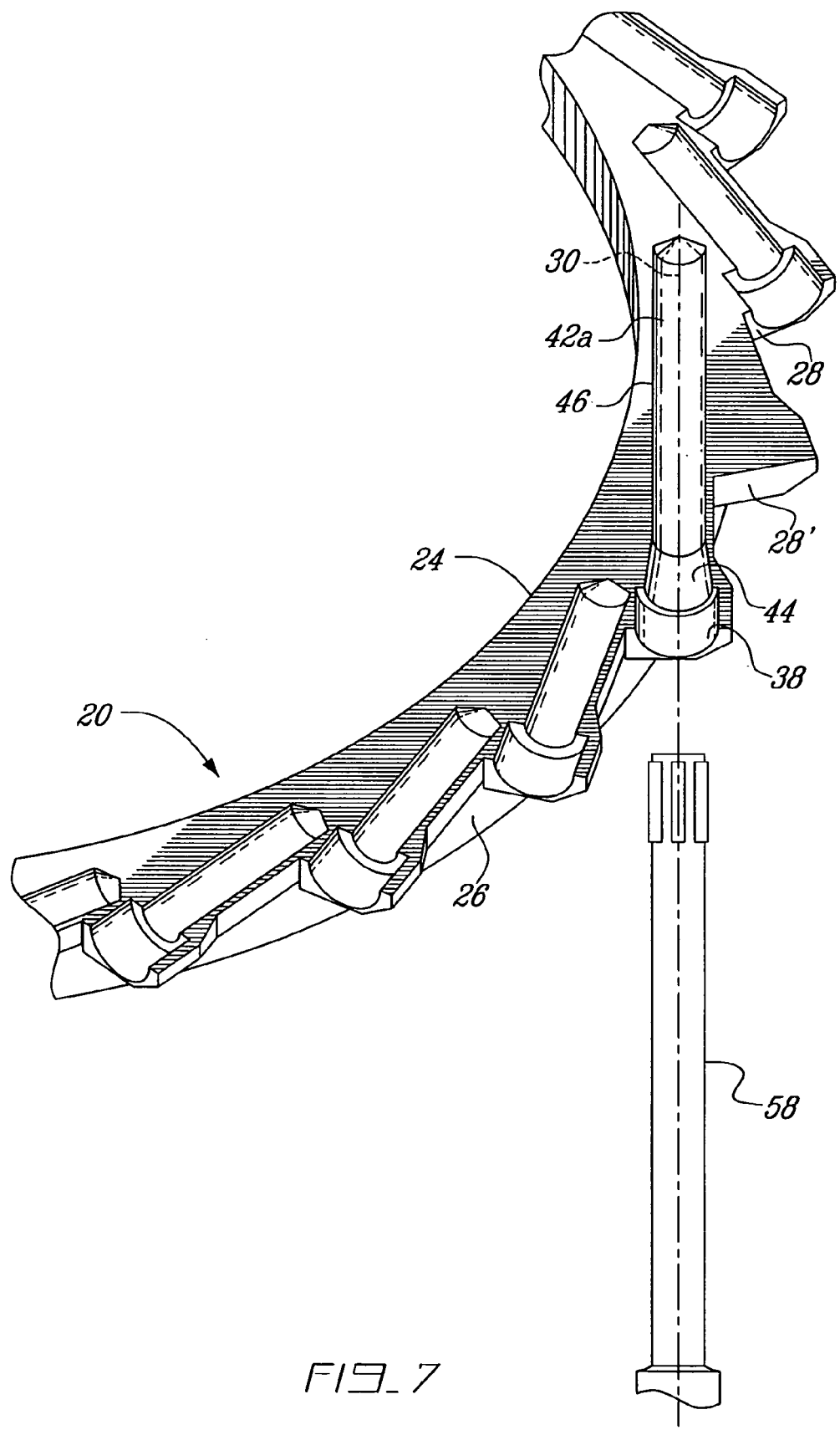
FIG_7

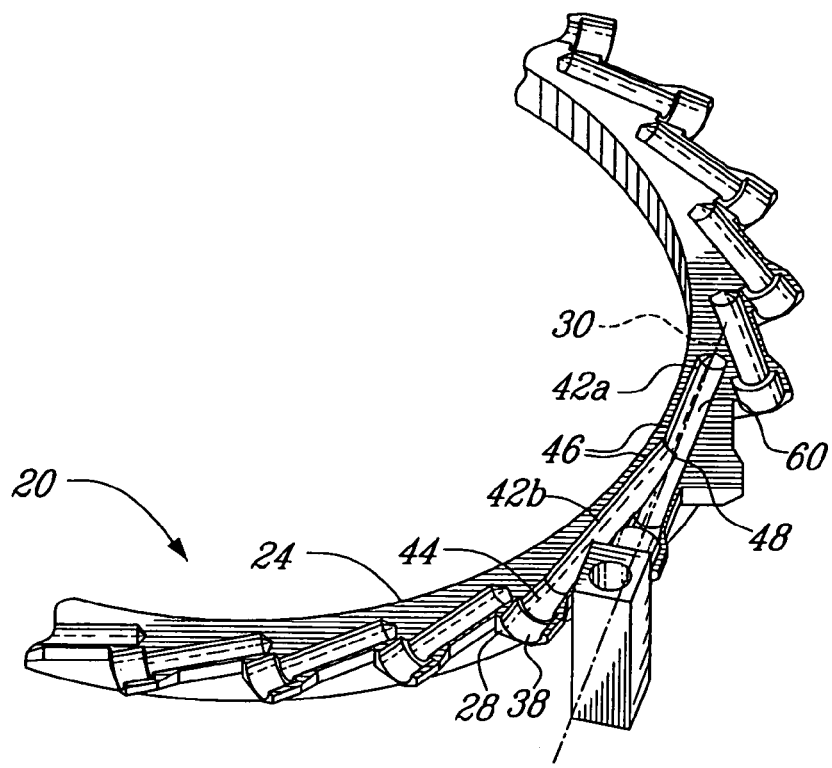
FIG_8
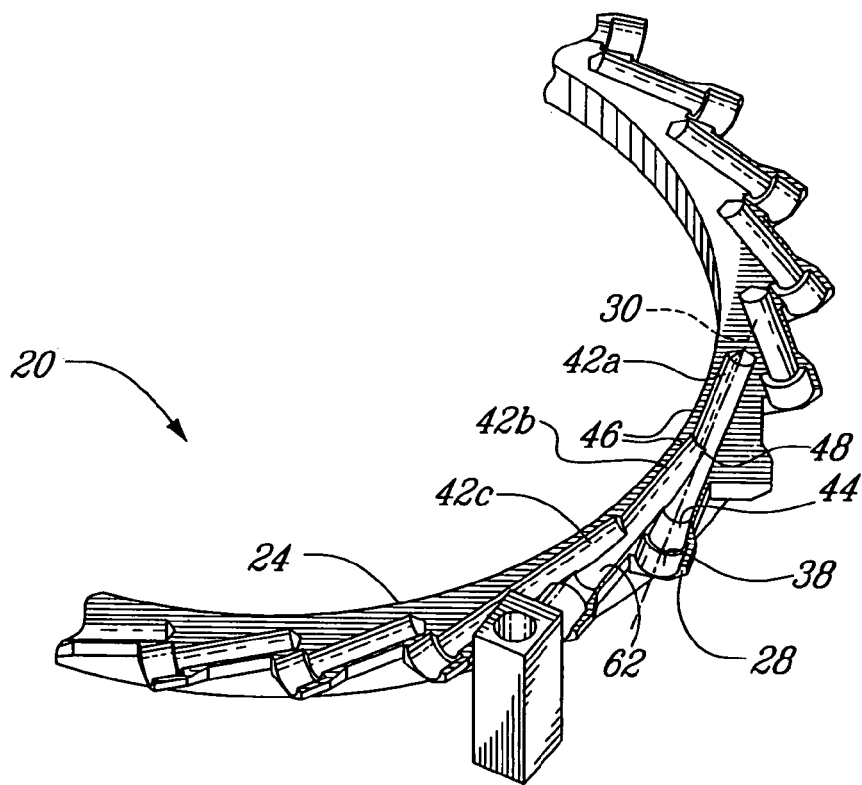
FIG_9

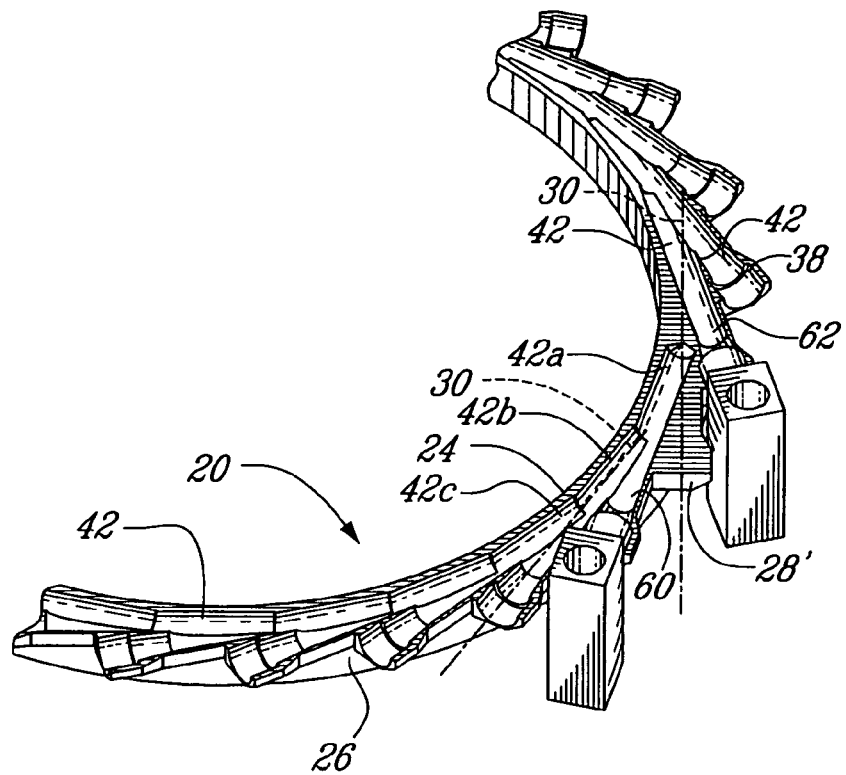
FIG_10
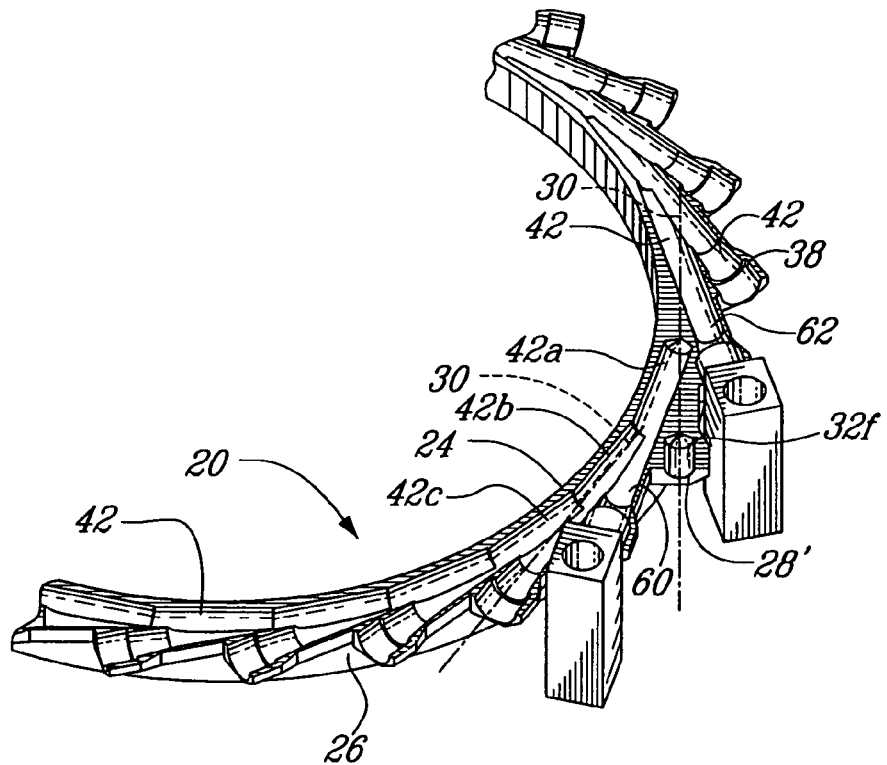
FIG_11

METHOD OF MAKING A GAS TURBINE ENGINE DIFFUSER

CROSS-REFERENCED TO RELATED APPLICATION

This application is a continuation of U.S. patent application Ser. No. 10/194,556, filed Jul. 15, 2002, now U.S. Pat. No. 6,760,971.

FIELD OF THE INVENTION

The invention relates to a gas turbine engine diffuser, and more particularly to a method of machining a gas turbine engine diffuser.

BACKGROUND OF THE INVENTION

The compressor section of a gas turbine engine includes a diffuser downstream of the compressor. The function of the diffuser is to reduce the velocity of the compressed air and simultaneously increase the static pressure, thereby preparing the air for entry into the combustor at a lower velocity. Presenting high-pressure and low-velocity air to the combustor section is essential for proper fuel mixing and efficient combustion.

A centrifugal compressor impeller draws air axially, and rotation of the impeller increases the velocity of the air flow as the input air is directed over impeller vanes to flow in a radially outward direction under centrifugal forces. In order to redirect the radial flow of air exiting the impeller to an annular axial flow for presentation to the combustor, a diffuser assembly is provided which redirects the flow as it also reduces the velocity and increases static pressure of the air flow.

A conventional diffuser assembly of this type, sometimes known as a fishtail diffuser, generally comprises a machined ring which surrounds the periphery of the impeller for capturing the radial flow of air and redirecting it through generally tangential orifices into an array of diffuser tubes. The orifices in the diffuser ring are circumferentially spaced apart, each one being intersected by two adjacent bores in an asymmetrical configuration. The diffuser tubes are generally brazed or mechanically connected to the ring and have an expanding cross-section rearwardly.

In general, the design of diffusers requires a compromise between the desired aerodynamic properties and the practical limits of manufacturing procedures. For example, the orifices in the impeller surrounding ring are typically cylindrical bores or conical bores due to the limitations of economical drilling procedures. To provide elliptical holes for example, would involve prohibitively high costs in preparation and quality control.

Engine performance is directly affected by the quality of the tangential diffuser bores. For good performance, a very accurate diameter and true position of these bores, a sharp edge of the bore intersection area and a very good surface finish of these bores are all required. This makes the diffuser one of the most costly and difficult parts of the gas turbine engine to manufacture.

The manufacturing process for the diffuser typically includes both roughing and finishing operations on its various surfaces. It is common practice to complete the roughing operation for all surfaces before beginning the finishing operation. This is done for convenience of changing tools, etc., and more importantly to prevent damage to the finished surfaces by completing the roughing first. Conventionally, diffuser bores in a diffuser ring are machined with a gun drilling machine which performs the roughing process for all bores in the diffuser ring, and then the finishing process is performed with a cylindrical and/or taper reamer.

Because of the configuration of the intersecting bores in a roughed-out diffuser, the finishing tool is always between the two intersections of the adjacent bores when finishing the bores. The two intersections of adjacent bores are not symmetrical, and therefore, the radial cutting force on the finishing tool is unbalanced, creating undesirable tool deflection, which results in poor quality of both position and diameter.

Furthermore, the unbalanced radial cutting force and the tool deflection inhibit the use of carbide tools which are adapted for high speed cutting but are too brittle to handle tool deflections normal in this type of operation. Thus, productivity of the diffuser bore machining process is limited. The conventional process also cannot provide a superior quality of surface finishing of the diffuser bores because the asymmetrical intersections of each diffuser bore limits the use of super-finishing tools such as burnishing tools.

Therefore, an improved process for machining the bores in the diffuser ring with better quality control and better productivity is desired.

SUMMARY OF THE INVENTION

One object of the present invention is to provide an improved method of machining diffuser bores in a gas turbine engine diffuser ring which minimizes tool deflection.

Another object of the present invention is to provide a method of machining diffuser bores in a gas turbine engine diffuser ring which improves the surface finish of the diffuser bores.

In general terms, a method in accordance with one aspect of the present invention is to provide for machining a plurality of circumferentially spaced bores in an object, each of the bores extending generally tangentially and inwardly and being positioned in the object so as to generally asymmetrically intersect two adjacent bores. The method comprises steps of (a) providing the object; (b) determining a plurality of bore positions generally around a circumference of the object; (c) machining a first bore; (d) performing at least one subsequent machining operation on the first bore to complete a machining process of the first bore; (e) machining a second bore immediately adjacent to the completed first bore, wherein the second bore is machined so as to intersect the completed first bore; (f) performing at least one subsequent machining operation on the second bore to complete a machining process of the second bore; (g) sequentially machining a remaining plurality of bores except a final bore, wherein each bore is machined so as to intersect an immediately adjacent completed bore; and (h) machining the final bore positioned at one side thereof immediately adjacent to the first bore and at the other side thereof immediately adjacent the bore previously completed, wherein the final bore is machined so as to intersect the two immediately adjacent completed bores positioned at opposite sides thereof.

It is preferable that when each of the second bore to the final bore is to be machined, a bore position is selected such that an intersection of the bore and a previously completed adjacent bore will occur at an end of the bore while the bore being machined. Thus, a cutting tool in each bore except the first and final bores is affected by only one of the two intersections. By avoiding the intersection that is relatively closer to the bore entry, the tool will work properly for a longer portion of the bore, without any deflection.

It is also preferable that a plug is inserted into a previously completed adjacent bore before machining the next bore, except for the machining of the first bore.

The method according to the present invention, when being used to machine diffuser bores in a gas turbine engine diffuser ring, advantageously reduces manufacturing costs by providing improved quality of position and diameter, thereby eliminating scraps and deviations. Manufacturing costs are further reduced by the reduction in machining time and lead-time, which increases productivity. Furthermore, the method of machining diffuser bores in a gas turbine engine diffuser ring according to the present invention provides a better surface finish of the diffuser bores and a better repeatability of the turbine engine diffuser rings, which both improve turbine engine performance.

Other advantages and features of the present invention will be better understood with reference to a preferred embodiment of the present invention described below.

BRIEF DESCRIPTION OF THE DRAWINGS

Having thus generally described the nature of the present invention, reference will now be made to the accompanying drawings, showing by way of illustration the preferred embodiment thereof, in which:

FIG. 1 is a perspective view of an unfinished diffuser ring according to the present invention, in which the diffuser ring is cut away to show a cross-section thereof, the diffuser ring having a plurality of preliminary bores drilled therein, by a start drill;

FIG. 2 is the diffuser ring of FIG. 1, showing counter bores machined by a counter-bore rougher;

FIG. 3 is a partial perspective view of the diffuser ring of FIG. 1, with a first bore drilled by a gun drill;

FIG. 4 is the diffuser ring of FIG. 3, showing the first bore reamed by a cylindrical reamer;

FIG. 5 is the diffuser ring of FIG. 3, showing the first bore finished by a combined taper and counter-bore reamer;

FIG. 6 is the diffuser ring of FIG. 3, showing the first bore super-finished, using a taper burnishing tool;

FIG. 7 is the diffuser ring of FIG. 3, showing the first bore super-finished, using a cylindrical burnishing tool;

FIG. 8 is the diffuser ring of FIG. 3, showing a second bore completed and intersecting the completed first bore into which a plug has been inserted;

FIG. 9 is the diffuser ring of FIG. 3, showing a third bore completed and intersecting the completed second bore into which a new plug has been inserted;

FIG. 10 is the diffuser ring of FIG. 3, showing the two plugs remaining in the completed bores adjacent to a position reserved for a final bore in the ring to be machined;

FIG. 11 is the diffuser ring of FIG. 3, showing the two plugs remaining in the completed bores adjacent to a preliminary bore drilled in the position reserved for the final bore to be machined;

DETAILED DESCRIPTION OF THE PREFERRED EMBODIMENT

Figure 12:
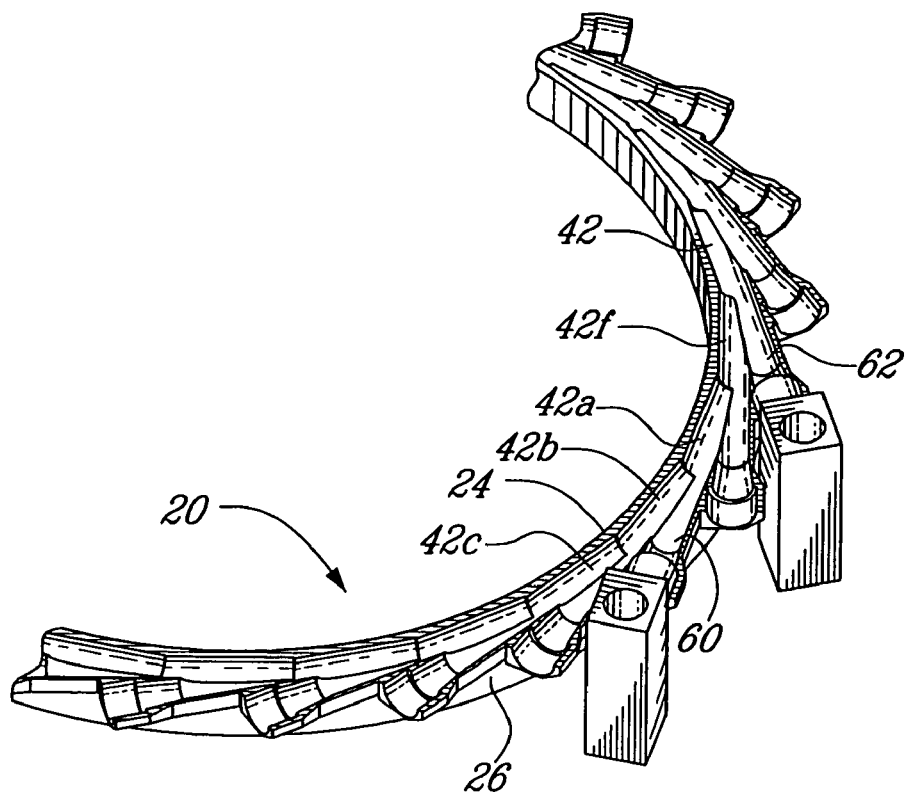
FIG. 12 is the diffuser ring of FIG. 3, showing the final bore being completed while the two plugs are maintained in the respective adjacent previously completed bores.

A process of machining a plurality of diffuser bores in a turbine engine diffuser ring of the general type described in U.S. Pat. No. 5,387,081, issued to LeBlanc on Feb. 7, 1995. incorporated herein by reference, is described step-by-step below. The diffuser bores are circumferentially and typically, equally spaced apart, and surround a turbine engine impeller in tangential positions when the diffuser ring is assembled with the impeller. Each diffuser bore is intersected by two adjacent diffuser bores in an asymmetrical configuration which will be more clearly described with reference to the drawings hereinafter. However, the example described below is illustrative of one use of the method according to the present invention. The invention need not necessarily be applied only to a diffuser ring of a gas turbine engine however, and may be applied to produce any object having bores extending circumferentially and generally inwardly, so that two adjacent bores intersect in an asymmetrical configuration.

In FIG. 1 a turbine engine diffuser ring, generally indicated by numeral 20, is adapted to surround a turbine engine impeller 22 the position of which is schematically represented by broken lines. The diffuser ring 20 is illustrated in full-section, the top half having been removed to show details of the diffuser ring 20. Similar views of the diffuser ring 20 are shown in other figures. The diffuser ring 20 has a circular inner periphery 24 and an outer periphery 26 with a plurality of radially projecting portions to provide respective mounting surfaces 28. Each mounting surface 28 is perpendicular to an axis 30 which extends tangentially to the diffuser ring 20.

Figure 13:
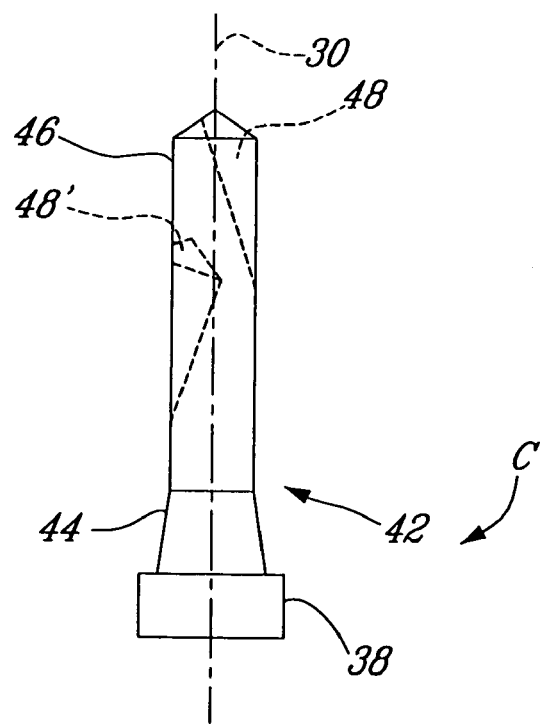
FIG. 13 is a schematic illustration of one of the completed bores in the diffuser ring of FIG. 12, showing two intersections of the bore.

An intended diffuser bore 42 when completed, as shown in FIG. 13 includes the counter bore 38, a tapered portion 44 immediately adjacent to the counter bore 38 and a cylindrical portion 46 immediately following the tapered portion 44. The cylindrical portion 46 of the diffuser bore 42 is intersected at its bottom end by one adjacent bore (not shown) at one side, which is illustrated as intersection 48, and is intersected at its middle by the other adjacent bore (not shown) at the other side thereof, which is illustrated as intersection 48'. When a first bore is machined tools will not be affected by any intersections because there are no adjacent bores made at this point in the operation. Tools will be affected by the intersections 48 and 48' while a final one of the diffuser bores 42 is being machined because of the existence of the completed adjacent bores. However, the tool will be affected by only one of the intersections 48, 48' while roughing or finishing each of the diffuser bores 42 from the second to the second-final, in the process of completing one after an adjacent one, according to the present invention.

Referring again to FIG. 1, the machining process of the diffuser bores in the diffuser ring 20 begins with drilling a plurality of preliminary bores 32 which function as pilot holes during the machining operation, each extending inwardly from a corresponding mounting surface 28 and along the corresponding axis 30 which itself corresponds to one of the diffuser bores to be machined in the diffuser ring 20. However, the number of preliminary bores 32 is one less than the number of the diffuser bores to be machined in the diffuser ring 20. Thus, one mounting surface which is identified as 28' is reserved without a preliminary bore 32 drilled therein. Each of the preliminary bores 32 is drilled by a start drill 34, to a limited depth so that adjacent preliminary bores 32 do not yet intersect one another. The diameter of the preliminary bores 32 is smaller than the size of the completed diffuser bores, and so further machining processes can be conducted to complete the diffuser bores.

In FIG. 2 a carbide counter-bore rougher 36 is used to machine a counter-bore 38 of each preliminary bore 32. The diameter of each counter bore 38 is smaller than the intended size of the counter-bore of the completed diffuser bore. The drilling of the preliminary bores 32 and the roughing of the counter bores 38 are preferably conducted using a coolant-through process which is preferred because it can be performed at relatively fast cutting speeds.

In FIG. 3, a gun drill 40 is used preferably in a coolant-through configuration to rough a first bore 42a along the preliminary bore 32 immediately adjacent to the mounting surface 28. The gun drill 40 has the same diameter as the start drill 34 of FIG. 1 and is guided by the corresponding preliminary hole 32 which serves as a bushing for the gun drill 40. The first bore 42a is drilled to a desired depth and extends in close proximity to the inner periphery 24 of the diffuser ring 20, but not therethrough. The cutting speed of the drilling operation is slower relative to that in the drilling of the preliminary bores 32 because the longer gun drill 40 is being used to drill the deeper bore.

The preliminary bore 32 selected first as a pilot hole for the first bore 42a of FIG. 3, is selected from one of the two bores adjacent to the mounting surface 28' which is reserved for the final bore to be machined in such a way that an intersection of the first bore and a second bore will occur at a bottom end of the second bore while the second bore is being drilled and finished. In this example, the position selected for the first bore should be located at the left side of the mounting surface 28' in order to begin the machining operation of all bores in a clockwise sequence. This will be further described with reference to FIG. 13 hereinafter.

In a next step of the process, as shown in FIG. 4, a cylindrical reamer 52, preferably with carbide tips, is used, preferably in a coolant-through configuration, to finish the cylindrical portion 46 of the same bore, namely the first bore 42a.

In FIG. 5, the first bore 42a is then machined to provide the tapered portion 44 with a finished surface, next to the counter bore 38. The forming and finishing of the tapered portion 44 may be conducted simultaneously with the finishing of the counter bore 38 by using a coolant-through combined taper and counter-bore reamer 54, which is preferable for this step.

In FIG. 6 a taper burnishing tool 56 is used to super-finish the taper portion 44. The taper burnishing tool 56 preferably includes multiple rollers which machine a superficial plastic deformation on the tapered surface of portion 44 while the tool is being pushed and rotated into the tapered portion 44 of the first bore 42a.

In FIG. 7 the cylindrical portion 46 remaining after the tapered portion is super-finished, preferably by using a cylindrical burnishing tool 58. The rollers of the burnishing tools 56, 58 are used to reduce the peaks and valleys on the surfaces of the tapered and cylindrical portions 44, 46, respectively, and create a highly polished surface finish thereby having positive effects on engine efficiency. The advantage of using burnishing for super-finishing is the high productivity (as it is a quick process) and longer tool life. After the super-finishing process of the tapered portion 44 and the cylindrical portion 46, the first bore 42a is finally completed. One skilled in the art will recognize that super-finishing is a step which is especially useful when machining aerodynamic surfaces, but is not always required or desired in other machining operations.

With reference to FIG. 8, a plug 60 is inserted into the completed first bore 42a in order to minimize tool deflection and to facilitate evacuation of the chips produced during the machining of the second one 42b of the diffuser bores, as will be described further below. This plug 60 must be fit into the completed first bore 42a and snugly fixed therein, preferably within the cylindrical portion 46 thereof to avoid any gap or relative movement between the plug 60 and the bore 42a. The plug 60 is preferably made of the same material as the diffuser ring 20 in order to provide similar cutting characteristics. The plug 60 is also preferably coated in a thin plastic layer to protect the high quality finish of the surface of the completed first bore 42a.

After the plug 60 is inserted into the completed first bore 42a, a second bore 42b adjacent to and on the left side of the first bore 42a, is machined by executing the steps described above with respect to the first bore 42a.

During the drilling of the second bore 42b, the plug 60 will be machined by the gun drill 40 in the step illustrated in FIG. 3, thereby creating a partial hole in the middle portion of the plug 60 having the same diameter as the gun drill 40, and generating the intersection 48 which is located at the bottom end of the second bore 42b and on a middle position of the completed first bore 42a. The shape and position of the intersection 48 is more clearly shown in FIG. 13. The plug 60 in the completed first bore 42a, serves as support for the gun drill 40 and facilitates chip evacuation while the second bore 42b is being drilled, which reduces tool deflection of gun drill 40 and permits the formation of a relatively sharp edge between the two adjacent bores 42a and 42b at the intersection.

During the finishing of the cylindrical portion 46 of the second bore 42b, the plug 60 will also be machined along the intersection 48, as during the drilling process. The partial hole in the plug 60 will be further machined to have a diameter the same size as the cylindrical reamer 52 of FIG. 4 and larger than that of the gun drill 40 of FIG. 3. In this step, the plug 60 similarly serves as support for the cylindrical reamer 52 and facilitates chip evacuation, as well as providing a sharp edge of the intersection 48 on the second bore 42.

During the finishing of the tapered portion 44 and the counter bore 38 of the second bore 42b, the plug 60 is not machined by the combined taper and counter-bore reamer 54 of FIG. 5, but does facilitate chip evacuation. During the super-finishing of the taper portion 44 of the second bore 42b, the plug 60 is also not touched.

When the cylindrical portion 46 of the second bore 42b is being super-finished, the burnishing tool 58 of FIG. 7 may stop before it reaches the intersection 48 of the second bore 42b, or it may penetrate all the way to the end of the second bore 42b while the cylindrical portion 46 of the second bore 42b is being super-finished. In this embodiment it is preferable to stop before reaching the intersection 48 of the second bore 42b because the portion of the second bore 42b remaining un-burnished is insignificant and repeated exposure to intersection 48 may damage the burnishing tool over time and thereby reduce its performance and productivity.

Referring to FIG. 9, those steps described in the machining of the second bore 42b are repeated for a third bore 42c, and so on, until each remaining bore 42, except for a final bore 42f (see FIG. 12) is completed. However, the use of plugs during the machining of each of those successive bores differs from the use of the plug 60 in the machining of the second bore 42b. The plug 60 inserted in the first bore 42a was machined to have a partial hole having the same diameter as the cylindrical reamer 52 of FIG. 4, while the second bore 42b was being reamed. The diameter of the partial hole of the plug 60 is larger than the diameter of the gun drill 40 of FIG. 3. Therefore, the plug 60 cannot properly guide and support the gun drill 40, and will be referred to as reaming plug 60.

In order to provide better support for the gun drill 40 of FIG. 3 in the drilling of a third bore 42c, a new plug 62 should be inserted into the completed second bore 42b for the gun drilling operation. The new plug 62 is machined to have a partial hole having the same diameter as the gun drill 40 of FIG. 3 and is referred to as the gun drilling plug 62. The gun drilling plug 62 is kept exclusively for gun drilling operations of each of the remaining bores 42, excluding the final bore 42f. Thus, the partial hole of plug 62 is not further machined and plug 62 provides effective support to the same gun drill 40 for every succeeding bore 42.

In the reaming operation of each of the remaining bores 42, the gun drilling plug 62 in the adjacent previously completed bore (for example, bore 42b is the adjacent previously completed bore when bore 42c is being machined, as shown in FIG. 9) will be replaced by the reaming plug 60 after the gun drilling operation is completed for that bore. The reaming plug 60 having a partial hole of with the same diameter as the cylindrical reamer 52 of FIG. 4, provides effective support to the same cylindrical reamer 52 for every succeeding bore 42. This reaming plug 60 and the gun drilling plug 62 are alternately used for machining each one of the bores 42 from the third bore to the second-final bore.

The plugs 60, 62 may include means for preventing rotation within the bores 42, such as are known in the art, thereby ensuring that every time plug 60 or 62 is inserted into an immediately adjacent completed bore 42, the partial holes machined in the plugs always accurately align with the axis 30 of the bore 42 to be machined next. Thus, damage of the plugs 60, 62 is prevented when the plugs are used repeatedly.

FIGS. 10 and 12 illustrate the machining process of the final bore 42f in the diffuser ring 20. After all bores 42, except the final bore 42f are completed, and before the drilling operation of the final bore 42f begins, the reaming plug 60 is inserted into the completed first bore 42a and the gun drilling plug 62 is inserted into the completed second-final bore 42 which was finished immediately before machining of the final bore 42f is begun.

Referring to FIGS. 11 and 12, the machining operation of the final bore 42f is started with the drilling of a preliminary bore 32f extending from the mounting surface 28'. This final preliminary bore 32f in the diffuser ring 20 is similar to the preliminary bores 32 of FIG. 1, but is shorter so that this final preliminary bore 32f will not intercept either adjacent completed bore 42 or 42a. Plugs 60 and 62 are inserted into the completed first bore 42a and the completed second-final bore 42, respectively, which can be done either before or after the drilling of the final preliminary bore 32f.

After the short, final preliminary bore 32f is drilled, the gun drilling operation described with reference to FIG. 3 is repeated for roughing the final bore 42f. During the gun drilling operation of the final bore 42f, the reaming plug 60 retained in the completed first bore 42a is now being machined in an un-machined region at its bottom end exposed to the intersection and on a side opposite to the previously machined partial hole. Thus, the larger partial hole of the reaming plug 60 does not affect the proper support to the gun drill 40, which will be further described with reference to FIG. 13. The gun drilling plug 62 retained in the right hand adjacent completed bore 42, i.e. the second-final bore, supports the gun drill 40 of FIG. 3, during the drilling of the final bore 42f, in the same way described above with respect to other bores 42. The machining process of the final bore 42f is then conducted step-by-step for counter-bore roughing, cylindrical reaming, taper forming and reaming, roller taper burnishing and roller cylindrical burnishing in steps similar to those described above and will not be redundantly described herein. The plugs 60 and 62 remain in the completed first bore 42a and the previously completed right hand adjacent bore 42 respectively, during all of those steps in the completion of the final bore, until the final bore 42f is completed, as shown in FIG. 11. The plugs 60 and 62 are then removed.

After all diffuser bores 42, 42a, 42b, 42c and 42f are machined in the diffuser ring 20 as shown in FIG. 12, and the plugs 60 and 62 are removed, the diffuser ring 20 is then machined at the inner periphery 24 in order to open the bottom end of every diffuser bore 42, 42a, 42b, 42c and 42f at the inner periphery 24 of the diffuser ring 20. The diffuser ring 20 is now ready for use in the gas turbine engine.

It should be noted that after the final bore 42f is completed, plugs 60 62 are both machined such that neither plug 60 nor plug 62 can be used in a gun drilling operation again to properly support the gun drill 40. Therefore another pair of new plugs are required in the machining of another diffuser ring.

Referring to FIG. 13, when the entire machining process is conducted in a clockwise sequence, as shown by arrow C, the tool used for drilling or finishing the bore 42 is only affected by intersection 48 at the bottom end of this bore because the adjacent bore at the left side thereof has not yet been machined and therefore intersection 48' does not yet exist. By avoiding the intersection 48' that is closer to the bore entry, the tool is able to work properly for a longer portion of the bore, without any deflection. In addition, this longer portion can be better finished by burnishing, as described above, and it serves as a guide for tools during the machining of the intersection portion 48 that is at the bottom of the bore. Therefore, the clockwise sequence is desired.

Still referring to FIG. 13, when a plug is inserted into the bore 42 and the adjacent bore (not shown) at the left side is being machined, the partial hole made in the plug is located at and shaped as the intersection 48'. Plugs 60, 62 are always machined at the middle and left side 48' except the plug 60 inserted into the first bore 42a as illustrated in FIG. 12 when the final bore 42f is being machined. Only in this case, the plug 60 is machined at a region located at and shaped as the intersection 48. This also explains the reason that the reaming plug 60 in this case can be used to support the gun drill that is drilling the final bore 42f.

However, it should be noted that the clockwise sequence of the bore machining process is determined by the tangential positions of the diffuser bores 42 in the diffuser ring 20, as shown in FIG. 11, in which diffuser bores 42 extend inwardly and counter-clockwisely. If the diffuser bores extend inwardly and clockwisely, the bore machining process should be conducted in a counter-clockwise sequence.

In order to machine all diffuser bores in a clockwise sequence, the first bore 42a of FIG. 3 should be drilled along one of the preliminary bores 32 adjacent to and at the left side of the mounting surface 28' which is reserved for the final bore to be machined, as described above. Thus, it is possible to machine other bores in a clockwise sequence from the first bore 42a.

Modifications and improvements to the above-described embodiment of the present invention may become apparent to those skilled in the art. The foregoing description is intended to be exemplary rather than limiting. The scope of the present invention is therefore intended to be limited solely by the scope of the appended claims.

We claim:

1. A method of machining a plurality of intersecting bores in an object, the method comprising steps of:
   a) machining a first bore;
   b) plugging the first bore with a first plugging member;
   c) machining a second bore adjacent the first bore so as to acutely intersect the first bore and the plugging member;
   d) removing the plugging member from the first bore;
   e) plugging the second bore with the first plugging member; and
   f) machining a third bore adjacent the second bore so as to acutely intersect the second bore and the first plugging member.

2. A method as claimed in claim 1 further comprising the step of plugging a fourth bore with a second plugging member prior to performing step f).

3. A method as claimed in claim 2 wherein the second bore and the fourth bore intersect the third bore asymmetrically.

4. A method as claimed in claim 2 wherein the plugging members are made of the same material as the object.

5. A method as claimed in claim 2 wherein the plugging members are adapted to protect a surface of the bores.

6. A method as claimed in claim 2 wherein the second and fourth bores are finished before the third bore is machined.

7. A method as claimed in claim 6 wherein the machining of the third bore comprises roughing and then finishing the third bore with the second and fourth bores plugged during the entire machining process of the third bore.

8. A method as claimed in claim 7 wherein the plurality of the bores are substantially identical and wherein the second plugging member in the fourth bore is previously used for finishing at least one of the bores.

9. A method as claimed in claim 8 wherein the second plugging member is inserted into the fourth bore in a manner in which the second plugging member will be intersected by the third bore at a portion not affected in the finishing process of any one of the bores other than the third bore.

10. A method as claimed in claim 1 wherein the object has a curved peripheral surface, and wherein the bores are disposed substantially tangentially relative to the curved peripheral surface.

11. A method as claimed in claim 1 wherein the first bore is finished before the second bore is machined.

12. A method as claimed in claim 11 wherein the machining of the second bore comprises roughing the second bore with the first plugging member remaining in the first bore, and then finishing the second bore with a second plugging member in the first bore to replace the first plugging member therein.

13. A method of machining a plurality of asymmetrically intersecting bores in an object, the method comprising steps of:
   a) machining a first bore;
   b) inserting a plug into the first bore;
   c) machining a second bore so as to acutely intersect a plugged portion of the first bore;
   d) burnishing a portion of the second bore limited to a depth less than the intersection of the first and second bores.

14. A method as claimed in claim 13 wherein machining the second bore comprises roughing and finishing the second bore with the plugging member remaining in the first bore.

15. A method as claimed in claim 14 wherein the plugging member is inserted into the first bore after the first bore is machined with a finishing process.

* * * * *